United States Patent [19]
Kufahl

[11] Patent Number: 5,797,306
[45] Date of Patent: Aug. 25, 1998

[54] LAMINATION NOTCHING APPARATUS

[75] Inventor: Larry I. Kufahl, Wausau, Wis.

[73] Assignee: Marathon Electric Mfg. Corp., Wausau, Wis.

[21] Appl. No.: 887,722

[22] Filed: Jul. 7, 1997

Related U.S. Application Data

[63] Continuation of Ser. No. 432,076, May 1, 1995, abandoned.

[51] Int. Cl.$^6$ .............................. B26D 5/20; F16H 7/02
[52] U.S. Cl. .................... 83/257; 83/267; 83/411.7; 83/733; 474/84; 474/153; 474/205; 474/903
[58] Field of Search ............... 83/257, 267, 410.7, 83/411.7, 414, 733, 734, 154, 76.6, 76.7, 76.8, 76.9; 72/420, 421; 474/148, 150, 153, 205, 903, 84, 88

[56] References Cited

U.S. PATENT DOCUMENTS

| | | |
|---|---|---|
| 1,349,958 | 8/1920 | Head . |
| 2,507,852 | 5/1950 | Case . |
| 2,554,331 | 5/1951 | Hunter . |
| 2,917,935 | 12/1959 | Haug .......................... 474/84 |
| 2,956,464 | 10/1960 | Charron ....................... 83/267 X |
| 3,862,672 | 1/1975 | Tappen et al. . |
| 3,996,812 | 12/1976 | Cappotto et al. . |
| 4,134,334 | 1/1979 | Johnson ....................... 72/421 X |
| 4,148,225 | 4/1979 | Redmond, Jr. et al. . |
| 4,331,049 | 5/1982 | Bergmann et al. . |
| 4,391,123 | 7/1983 | Salvagnini .................... 72/464 |
| 4,515,577 | 5/1985 | Cathey et al. ................. 474/153 X |
| 4,555,966 | 12/1985 | Klingel . |
| 4,586,915 | 5/1986 | Cathey et al. ................. 474/153 X |
| 4,643,701 | 2/1987 | Meyer et al. ................. 474/153 |
| 4,704,184 | 11/1987 | Oboshi ........................ 29/412 X |
| 4,708,700 | 11/1987 | Abe ............................ 474/205 |
| 4,833,760 | 5/1989 | Sundstrom . |
| 4,840,608 | 6/1989 | Araki et al. .................. 474/153 X |
| 4,878,886 | 11/1989 | Kitabayashi et al. ........... 474/153 X |
| 5,090,488 | 2/1992 | Cotton . |
| 5,283,946 | 2/1994 | Simmons et al. ............... 29/827 |
| 5,405,299 | 4/1995 | Kubo et al. ................... 474/205 |

Primary Examiner—Eugenia Jones
Attorney, Agent, or Firm—Andrus, Sceales, Starke & Sawall

[57] ABSTRACT

A lamination notching apparatus for forming dynamoelectric core laminations with winding slots includes a sprocket and drive belt system connecting an indexer to the drive table shaft of a lamination table. The indexer is driven from a punch drive and has an output sprocket. A coupling unit has a first sprocket and a second sprocket mounted on a common same shaft and connected by a passive clamp unit to produce a one-to-one rotation. Drive belts connect the indexer sprocket to the first sprocket and the second sprocket to the drive sprocket table shaft. The sprockets are formed with a special tooth profile to eliminate tooth-to-belt clearance and backlash with a standard HTD profile belt for precise rotary motion. The indexer is movably mounted for tension adjustment of the drive belt. The passive clamp unit includes telescoped tapered sprocket hubs on a tubular shaft, with a spring-loaded clamp nut and bolt passing therethrough. An air cylinder is coupled to the bolt to release the resilient clamp of the sprockets for separation of the bolt unit for changing the sprockets and for phase orientation of the sprockets with the table drive in a reference position.

9 Claims, 4 Drawing Sheets

LAMINATION NOTCHING APPARATUS

This application is a continuation of Ser. No. 08/432,076, filed May 1, 1995, abandoned.

BACKGROUND OF THE INVENTION

This invention relates to a lamination notching apparatus and particularly to such apparatus for the forming of laminations for dynamoelectric machines.

Mass production of motors, alternators and the like generally include a laminated stator core and a laminated rotor core. The rotor will generally consist of a stack of like metal laminations secured to a rotating shaft. The rotor laminations have a central opening, generally with a notched construction, for interconnecting of the laminations and the shaft. The peripheral portion of the rotor lamination includes slots which may extend inwardly from the edge or set inwardly from the edge. The rotor winding is wound or cast within the rotor slots. The stator includes a stack of the annular members each having an inner diameter precisely related to, and supported in fixed relation to, the rotor to define a small air gap between the stator opening and the rotor surface. Again, the stator lamination, and particularly the inner peripheral portion includes winding slots which extend inward of the peripheral edge. A stator winding is wound within the stator slots. The appropriate slots are formed in the lamination using a notching machine to form the slots in each lamination. An appropriate stack of laminations is assembled to form the necessary magnetic core. In addition, locating and coupling notches and openings may be formed in the laminations which require specified locations with respect to other openings, slots and the like.

Mass production of dynamoelectric machines require rapid and accurate production of the lamination with the slots formed in each for subsequent stacking to maintain competitive manufacturing thereof. Although it is necessary to provide high speed, mass production, it is equally important to maintain the proper shape and spacing of the slots in the laminations such that a stack of the laminations include precisely aligned slots for receiving of the appropriate winding.

Notching machines have been commercially available for processing a series of round lamination into interrelated rotor and stator laminations for many years. Generally, unnotched lamination blanks are formed and then processed through the notching machine. Each lamination may be sequentially passed through a machine to notch first the outer or stator portion of the blank, and then notch the rotor or inner portion of the blank in a second pass. These two notching operations are preformed separately at different times and different set-ups. The notched blanks are then separated into rotor and stator blanks in a subsequent operation. The notching of the round and annular blanks on the circumferences requires relative rotary positioning between the blank and a punch unit in order to avoid providing a multiple punching unit.

Generally, an indexing system for rotating the lamination blank includes a suitable drive unit such as a motor coupled through a gear drive mechanism for rotating of the blank past the punch unit in a stepped fashion with a dwell period for a piercing operation, then rotating the lamination to the next location while the punch is in the upward portion of its stroke. A notching machine specification generally requires the spaced notches in the lamination blank to be substantially within ±0.005 inches. A plurality of change gears are incorporated into the system to produce the various desired spacing of the notches and the quality of the slots. The gear mechanism includes ratio change gears to provide the desired angular rotation of the blank to the proper degree for a specified notch spacing. In order to maintain the necessary quality of manufacture, the gears are subject to wear and also require relatively frequent replacement in mass production operations.

In assembly of the ratio change gears, the location and the mesh between the gears is important. The gears are fixedly secured in place using a bolt and nut arrangement to establish a proper mesh engagement of the teeth. If the gear mesh is overtightened, the gear life is significantly shortened. Further, within the gear train, the replaced new gear or gears may not mesh accurately with older gears in the system. This, too, will often result in improper mesh and poor notch alignment and spacing in the notched lamination.

Further, the present gear change procedure is costly, not only because of the cost of the new gears, but because of the time factor required to change the gears, either for a spacing ratio change or for worn gear replacement.

In the assembly for any particular series of laminations, precise angular location of the slots within that lamination may be desired, and in fact, necessary for quality commercial production. Thus, the initial positions of the punch unit and of the lamination indexer apparatus must be in a precise relationship such that the first notching of each lamination is properly located within the lamination. This notch location and alignment generally requires adjustment of the ratio gear system during the set up of the notching machine for any given notching sequence. The angular adjustment of the notch locations is made by adjusting set screws within the gear ratio system and shifting the phase relationship within the gear ratio system and thereby between the indexing mechanism and the lamination rotating mechanism. Presently, the above adjustment is established through a trial and error technique. Thus, the indexer and the drive are located in what appears to be proper relationship. A number of laminations are formed and checked. If the lamination so formed do not conform to the precise specifications, the ratio gear system is readjusted, a second run made and again checked. The sequential notching and checking is continued until the proper notch location is established. All laminations made in the set up runs are costly scrap product. The trial and error system further relies on the technical skill of the set up personnel and creates a difficult and time consuming process, and therefore a costly procedure.

There is, therefore, a need to provide a notching machine with a drive and indexing system with improved life within the indexing coupling system and which provides a coupling system having rapidly replaceable drive ratio elements, replaceable at a relatively low cost, while maintaining at least the quality standards provided by the various machines available to date. The apparatus should preferably reduce the time requirement for the set up of the machine for each particular notching relationship and sequence, and particularly avoid the costly trial and error set up method.

SUMMARY OF THE PRESENT INVENTION

The present invention provides an improved lamination notching apparatus and particular, notching apparatus drive system which provides the desired improvement in the set up of the machine for a particular blank lamination in a rapid and less costly manner, as well as providing a relatively long life drive coupling system, with low cost replacement of the wear parts within the coupling system.

Generally, in accordance with the present invention, the ratio gear and drive system is replaced with a special sprocket and belt coupling system connecting the main blank rotating drive unit to the indexing or indexer apparatus or unit. Generally, in accordance with this aspect of the invention, the drive unit for rotating the blank lamination has an input or drive sprocket. The indexer unit has an output sprocket. A coupling sprocket unit, with replaceable sprockets, is interposed between the main drive unit and the indexer unit. The coupling sprocket unit includes a coupling input sprocket and a coupling output sprocket, which are firmly interconnected to each other on a common axis for simultaneous rotation. Timing and drive belts are entrained about and coupled the output and input sprockets to the lamination drive sprocket and to the indexer unit sprocket respectively. As noted, the present system contemplates providing a notching machine which translates motion within ±0.003 inches. Generally, commercial timing belt systems provide a rather gross angular alignment between rotating shafts, and such systems are not generally available for finite alignment. In accordance with one aspect of the present invention, the sprocket is provided with a special tooth or cog profile to eliminate tooth-to-belt clearance and thereby maintains the desired translation motion without backlash. Alternatively, to maintain the translation motion, other known methods to eliminate backlash might be substituted for the sprocket modification such as the known split sprocket to provide high precise translation of the lamination. The latter systems are relatively costly and the modified replaceable sprocket provides a distinct and advantageous system for a notching machine.

The tension adjustment in a timing belt is important but significantly less critical than the gear mesh adjustment in a gear train unit. The combination of the sprocket and drive belt system therefore does not require the same operators skill to set the sprocket drive system required to appropriately tighten the known gear drive systems without overtightening the gear mesh.

Appropriate design of the system without backlash, or tooth-to-tooth displacement, provides an accurate translation of the lamination and thereby the notch spacing within the lamination. The inventor designed a sprocket using a special design formulation which is based on the number of teeth and the angular spacing therebetween in combination with specially designed constants to provide an E.D.M. cutting sequence for each tooth. The formulation creates intimate contact between the belt cog and the tooth face. This aspect of the invention is directly related to providing the accurate spacing of the slots within the lamination.

The coupling unit sprocket of the present invention further preferably includes a special mounting of the two coupling sprockets. This special mounting permits the rapid replacement of the coupling sprockets for changing of the drive ratio and therefore the spacing of the notches, as well as replacement of worn parts. With the preferred construction of the present invention, however, the inventor has found that there is essentially no wear within the drive coupling system. In this aspect of the invention, a passive and keyless clamping assembly or locking unit interconnects the indexer driven or input sprocket and the blank drive or output sprocket of the coupling unit to a rotating support. In a preferred construction the rotating support includes a rotating shaft. The sprockets include hub portions which are telescoped through an extension of at least one of the sprockets and releasably frictionally interlocked for simultaneous rotation as a unit on the sprocket shaft. The releasable interlock permits ready axial separation of the sprockets and is preferably created by angular or inclined mating surfaces. The angle of the mating surfaces is generally and preferably on the order of twenty degrees. The sprocket coupling unit includes a sprocket shaft mounted in a bearing structure, with a resilient clamping or loading unit coupled to the sprocket hubs, to establish a firm, reliable, interengagement between the sprockets and to the shaft and thereby creating a one-to-one rotation thereof. Thus, the indexer output sprocket precisely moves the drive sprocket. In addition, a powered release unit is coupled to the assembly to positively release the resilient loading of the coupling sprocket hubs. In this aspect of the invention, a hydraulic or air cylinder unit is preferably coupled to the bearing assembly. When power is applied, the cylinder unit has an operator which moves and releases the resilient loading on the sprockets, and allows the sprockets freedom to rotate individually and thereby change the phase orientation with respect to each other. Deactivating the cylinder allows the resilient loading to firmly and fixedly reclamp the sprockets in the adjusted relative orientation of the sprockets.

The resilient loading thus provides a passive but reliable force for maintaining the alignment of the two sprockets as a result of the friction between the tapered contact surfaces. Other releasable means could of course be provided to establish and releasably maintain such force between the two sprocket members.

In a preferred locking system of the two coupling sprockets, the one sprocket is carried on a flanged bearing shaft. The outer sprocket projects downwardly onto the hub of the first sprocket with inclined engaging surfaces. An elongated clasp member, such as a headed bolt, extends through the bearing shaft, with a release outer clamp member such as a nut attached to the upper end of the bolt. A set of Belleville washer springs or other suitable resilient member is interposed between the head of the bolt and the bearing shaft. The Belleville washers urge the clamping bolt outwardly, with the outer end of the bolt and particularly the nut moving into engagement with and forcing the sprockets into firm abutting drive engagement to each and to the shaft for establishing simultaneous one-to-one rotation.

To release the engagement, the motor unit has an operating member operatively engaging the underside of the bolt head. Actuation of the motor unit forces the operating member upwardly compressing the Belleville washers, and releasing of the clamping nut and the forced engagement of the sprockets. The nut and sprockets is are then readily removed and changed by hand, and replaced directly in a rapid and efficient manner.

In another aspect of the invention, the back-to-back alignment which requires the drive shaft and the indexer shaft to be in precise phase with each other at the initiation or start of the notching operation is readily established. This may be readily performed with the clamping assembly released by placing the indexer into the zero or null position of its indexing cycle. The blank drive sprocket is moved into engagement with a hand operated return stop member, such as a spring-loaded stop dog. This establishes the desired precise alignment. Deactivating of the cylinder unit moves the two coupling sprockets into interrelated driving engagement and establishes the proper back-to-back relationship between the indexing unit and the driver.

The present invention thus provides a significant improvement in the construction of lamination notching machines for forming of dynamoelectric machine laminations and other like components which require the precise indexing of the lamination with respect to the forming of the notching machine.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE ILLUSTRATED EMBODIMENT

Figure 1:
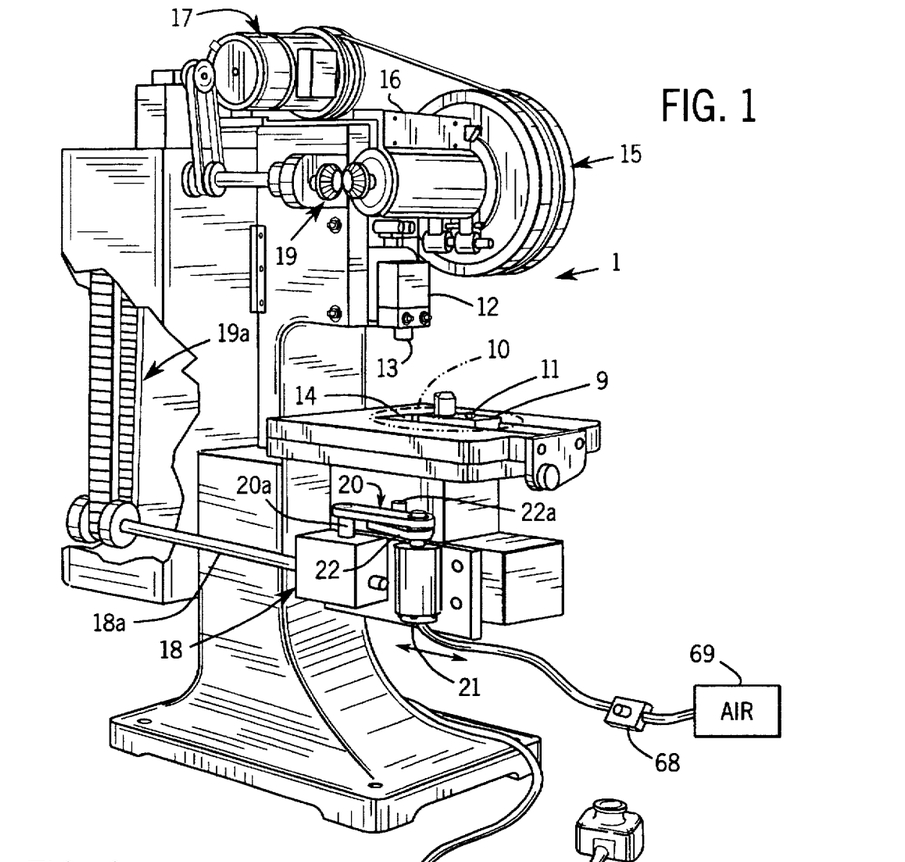
FIG. 1 is a diagrammatic view of a lamination notching apparatus for mass production of laminations for dynamoelectric machines.
Figure 2:
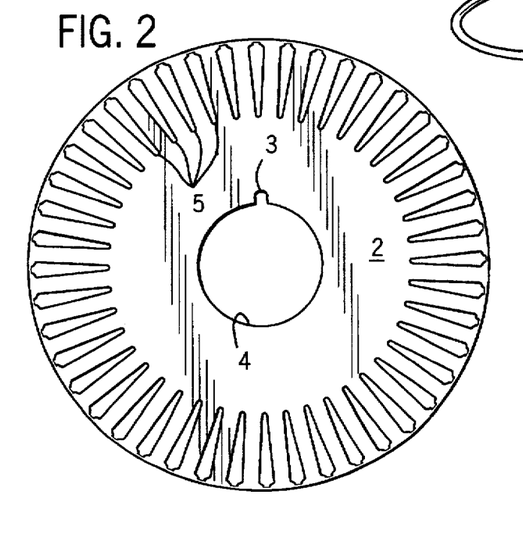
FIG. 2 is a plan view of a rotor lamination for a dynamoelectric machine formed in a notching apparatus of FIG. 1.

Referring to the drawings and particularly to FIG. 1, a high speed notching machine 1 is illustrated in simplified form. The notching machine 1 is particularly adapted and has been widely used for notching of dynamoelectric machine core laminations. FIG. 2 is a typical rotor lamination 2 for forming a rotor core for such machines. An annular lamination, not shown, for a stator core would include stator slots on the inner periphery for mounting with the rotor core rotatably mounted therein.

The rotor lamination 2 has a central opening 4 with a key-notch 3 for mounting to a shaft, not shown. A plurality of winding slots 5 are formed in the lamination terminating in the outer periphery. A stack, not shown, of the laminations 2 are joined to form an annular rotor core. A winding, not shown, is wound or die cast within the slots 5 of the core. The rotor lamination has a diameter slightly less than the diameter of the stator opening, and in the assembled relation, a small air gap exists between the members. The winding slots 5 of rotor lamination 2 and the winding slots of a stator lamination encircle the respective laminations and each set of slots 5 have the slots uniformly circumferentially distributed, with the interslot spacing substantially within ±0.005 inches. As such lamination structures are well known and widely used, no further description thereof is given other than in connection with the illustration of the present invention.

Similarly, high speed notching machines 1 are well known and widely used and the machine is only briefly described herein as necessary to clearly and fully describe the illustrated embodiments of the present invention.

Referring particularly to FIG. 1, the notching machine 1 includes a support unit including a laminating receiving holder shown as a lamination support table 9 which is rotatably mounted within the machine in any suitable manner. A blank lamination blank 10 without the slots formed therein but otherwise corresponding to the configuration as shown in FIG. 2 is firmly secured to the table 9. As diagrammatically illustrated, automatic clamping units 11 are mounted on the table and actuated through an automated clamping mechanism, not shown, to securely hold the lamination 10 to the table 9 in predetermined spacement. The table 9 is movable into and through a notching head 12 for forming of slots 5 in the lamination 10. Thus, the head 12 includes a notch punch assembly having a movable punch unit 13 and an aligned punch die 14. The punch unit 13 reciprocates vertically with respect to the underlining die unit 14, and removes the metal in accordance with the die to form the slot 5 in a precise location with the blank lamination 10.

The table 9 is coupled to be rotated in a synchronized movement with the cyclical movement of the punch unit 13. Each movement of the blank lamination 10 is a precise distance with respect to the last formed slot to provide a very accurate formation and spacing of the slots within the blank lamination 10, as more fully described hereinafter. The drive system for operating the punch unit 13 and rotating of the blank lamination 10 is a relatively high speed driving system, as the typical commercial notching machine produces approximately 700 strokes per minute, with corresponding creating spaced slots within each lamination blank in a series of successively positioned blanks. Thus, the notching machine 1 must rapidly insert and remove the laminations, with a subsequent one-step rotation of the blank lamination through the head within each stroke period of the machine.

In the present invention, the notching machine 1 is provided with a special table and punch drive system to maintain synchronized operation with precise orientation of a blank lamination with respect to the notching or punch unit 13 while providing an improved low cost drive system including both a reduced initial cost factor as well as minimal cost maintenance, resulting from essentially no worn parts requiring replacement and more rapid replacement of parts.

Figure 3:
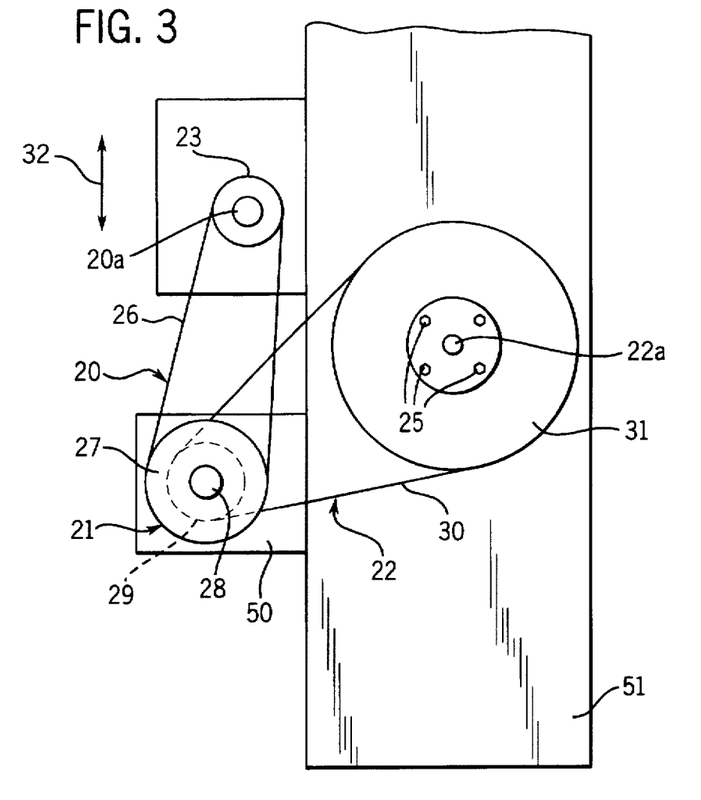
FIG. 3 is a diagrammatic plan view of an indexer drive system illustrating an embodiment of the present invention for the notching apparatus of FIG. 1, with accurate positioning of a lamination release within the notching apparatus in a sequential manner for forming spaced slots in the blank lamination as shown in FIGS. 1 and 2.

Referring to FIGS. 1–3, the drive system includes a punch and turn table drive system having a main drive unit 15 rotatably mounted to and within a suitable housing 16. A motor 17 rotates the drive unit 15 and establishes reciprocal vertical movement of the punch unit 13. Thus, each complete rotation of the drive unit 15 produces in the punch unit 13 a downward and upward motion. An indexer 18 has an output drive system coupled to the table 9 and cyclically operable to rotate the table a precise angle during the upper portion of the punch movement, and then establish a dwell period for the punching step, during the lower portion of the punch movement.

The illustrated indexer 18 is a preferably well known device and generally includes a Geneva drive or similar index device with a rotating input shaft 18a. As shown in FIG. 1, a bevel gear unit 19 drives a roller chain drive 19a which is connected to rotate shaft 18a and thereby the output shaft 20a of the Geneva drive. In the present invention, a connecting drive assembly includes a first sprocket and drive belt unit 20 which connects the output shaft 20a to a coupling unit 21. A second sprocket and drive belt unit 22 of the assembly, in turn, connects the coupling unit 21 to the drive shaft 22a for the table 9.

The indexer 18 generally creates an acceleration period and deceleration period for rapidly rotating of the blank 10 into a notching position within the punch unit 13 during the upper movement of the punch unit, followed by a dwell period during which the punch unit 13 operates to form the slot 5 within the blank lamination 10. This cycle is followed immediately by subsequent sequential identical cycles of acceleration/deceleration and dwell at a high stroke rate. Thus, during the dwell period, the slot 5 is formed and the lamination blank 10 is then rotated to align the punch unit 13 with the next lamination location to be notched. In practice, the indexer output is at rest for the lower portion of the punch movement, and for the upper portion generally accelerates and decelerates in a smooth sinusoidal motion, as a result of the Geneva or similar drive system. The indexer output develops a precise 60 degree rotation of its output shaft 20a and a connected output sprocket 23. The 60 degree rotation of the sprocket 23 must be accurately ratioed and transmitted to table 9 into precise angular steps of motion for locating the attached lamination 10.

The belt and sprocket drive assembly, with appropriate construction, provides a long life and low cost drive system which has been found to produce a highly cost effective replacement for the standard well known gear drive system presently used in all such indexing or notching apparatus known to applicant. The system significantly minimizes the costly component replacement of worn components such as required within a gear driven indexing system as well as minimizing the parts cost and the time required to effect the replacement for different notch spacing and maintenance within the drive positioning system.

Figure 4:
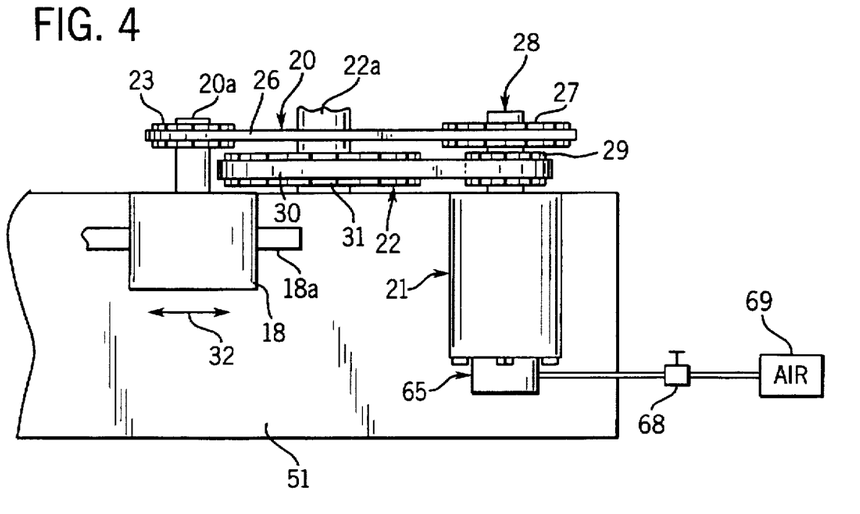
FIG. 4 is a side elevational view of indexer drive system as shown in FIGS. 1 and 3.

Referring particularly to FIGS. 3 and 4, the sprocket and drive belt unit 20 includes the relatively small diameter output sprocket 23 shown secured to the driven output shaft 20a of indexer 18. A mating drive belt 26 is coupled to the sprocket 23 and to an output sprocket 27 on the indexer coupling unit 21. Sprocket 27 is releasably mounted to a shaft unit 28, as more fully discussed hereinafter, and is rotatably mounted within the coupling unit 21. A somewhat smaller coupling output sprocket 29 is secured to the shaft unit 28, shown in underlying relationship to the sprocket 27. The sprockets 27 and 29 are releasably coupled to each other as a part of the input coupling unit 21 such that the rotation of sprocket 27 results in a one-to-one rotation of the coupling output sprocket 29. A drive belt 30 engages the sprocket 29 and an input drive sprocket 31 secured to a table drive shaft 22a. The sprocket 31 is shown connected to the shaft 22a by suitable hub and bolts 25 (FIG. 3) in accordance with well known construction. Thus, each rotation of the sprocket 23 results in a related rotation of the drive sprocket 31 and table 9.

The indexer 18 is movable relative to the coupling unit 21, as shown diagrammatically at 32 in FIG. 3, to control the tension in the indexer belt 26. Although not critical, the tension is adjusted to maintain precise driving relationship between the components.

Applicant has found that proper design of the sprocket and belt relationship with respect to the engaging teeth of the belt and sprocket is of substantial importance, if not essential, to minimize belt and sprocket wear. The belt 26 may tend to wear prior to the sprockets 23 or 27. However, the belt 26 is a low cost item and can be rapidly and efficiently replaced, with the replacement essentially producing an effectively new drive system. The illustrated system is particularly built to minimize wear in the sprocket and also to permit quick replacement of the sprocket.

Generally, commercial timing belts and the associated sprockets are manufactured to establish a relatively gross alignment between the parts, with 0.02 inch belt-to sprocket clearance. This tolerance is acceptable to provide an effective drive with minimal cost, even in high performance internal combustion engines. Applicant has found that in an application such as the present invention, the clearance is completely unacceptable because of the related backlash and small angular displacement resulting within the drive. Thus, the specification of a notching machine for forming of dynamoelectric machine laminations requires that each displacement be established within ±0.005 inches. The backlash and angular displacement associated with the conventional sprocket and belt drive is completely unacceptable. The inventor has developed a particularly unique interrelationship between the belt and sprocket to permit the construction of a long life sprocket which will accept a standard belt structure. As applied to a belt having a HDT profile, the following sprocket modification is made for each sprocket of each system.

Figure 5:
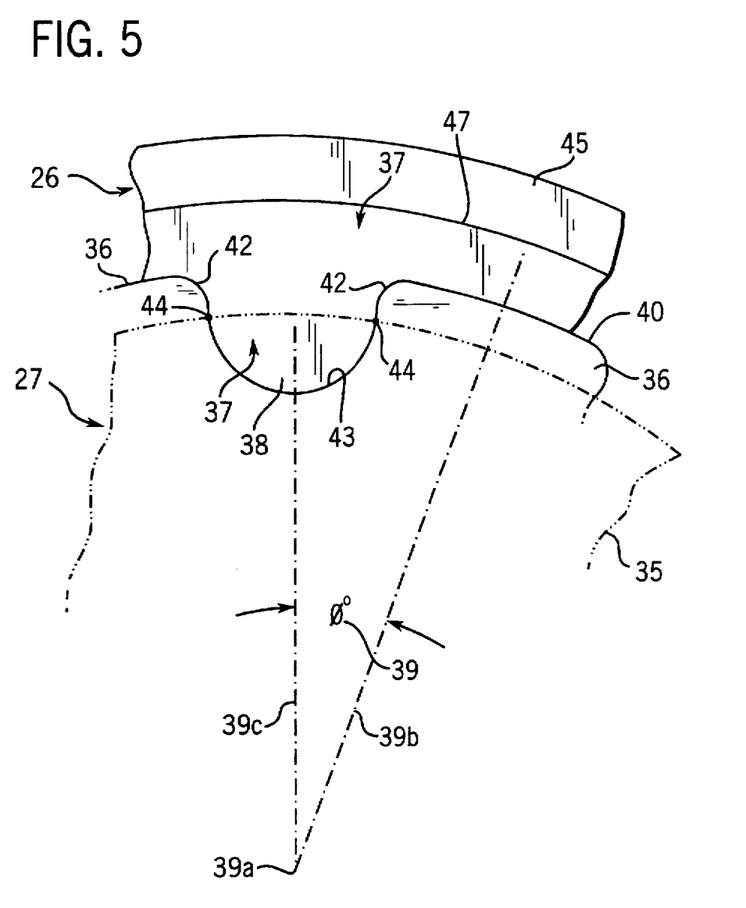
FIG. 5 is an enlarged fragmentary view of a sprocket and belt structure shown in FIGS. 3 and 4.

Referring particularly to FIG. 5, a fragmentary view of each sprocket for use with a standard HDT profile belt is disclosed. The sprocket 27 includes a circular body 35 having the identical teeth or cogs 36 equicircumferentially spaced about the periphery. Each tooth 36 is specially formed and spaced from the adjacent tooth 36 with a particular belt cavity 37 for receiving of the tooth 38 of the mating belt 26. Each tooth 36 is related to the adjacent tooth 36 and the cavity 37 formed therebetween by the same tooth angle 39. The angle is shown with respect to the center 39a of the sprocket body 35 and the center line 39b through a tooth 36 and the corresponding center line 39c through the tooth cavity 37. Each tooth 36 is formed on the same radius and thus develops an outer peripheral diameter surface 40 of a constant outside diameter, referred herein as O.D. The peripheral diametric surface 40 merges into the tooth cavity 37 with a round toothedge shown as constant radius concave wall 42 of a radius equal to 0.033 inches merging into the cavity base 43. The cavity base wall 43 is a concave wall of a constant radius equal to 0.100 inches and is connected to the concave radius wall 42 at the tangent point 44 between the wall 42 and base 43.

The belt 26 is constructed with an outer interconnecting base 45 and inner teeth 38 having a curvature generally corresponding to a standard HDT profile, with the tooth construction of a special configuration in accordance with the teaching of the present invention.

The belt 26 includes the outer base 45 formed by a multiple ply belt structure with an intermediate location or ply 47 located in slight outwardly spaced relation to the O.D. surface 40 of the sprocket teeth 36. The ply 47 is the pitch diameter of the belt as the belt moves about the sprocket 29. In moving about the sprocket with the pitch diameter 47, there is a slight inward deformation or offset of the teeth relative to each other. Applicant has found that this offset is directly related to and in a particular relationship with a special formulation. The number of engaged teeth and deflection is related to an angular orientation. The belt engages about 180 degrees of the sprocket. Thus, a large sprocket driven by a small sprocket would engage slightly more than 180 degrees, while the small sprocket would engage slightly less than 180 degrees. The belt pitch DP in moving about the sprocket should be equal to N×0.100255. The outside diameter (O.D.) of the sprocket teeth should be equal to the pitch diameter DP−0.054 inches. The teeth have a pitch radius RP equal to OD+2−0.033 inches. The described particular design essentially eliminated all backlash and offset displacement between the belt and sprocket. The result is essentially negligible wear on the sprocket, and therefore a significant operating life for the belt and sprocket.

With the present invention in actual commercial production for over six months, no replacement of the sprockets or belts has been required. The lack of replacement is in contrast to a conventional gear drive system in which gear replacement is often required on a monthly replacement cycle, with the same product production. If belt replacement is required, the belt structure is a relatively inexpensive component; costing, with present day costs, approximately $10.00. The belts are also readily and rapidly replaced by releasing of the tension and lifting of the belt from the two sprockets, replacing it with the low cost new replacement belt and reapplying the appropriate tension. The belt 26 is thus inexpensive and the replacement time is negligible.

Although sprocket 23 replacement may never be needed because of wear, replacement of a worn sprocket 27 for different ratio drives and related notch spacing within lamination, is such that each change is preferably established with a quick change structure incorporated into the coupling unit 20 and particularly permitting replacement of the intermediate indexing sprocket 27 and/or sprocket 29 for proper ratio drive. The assembly with the separated spaced coupling unit 21 is particularly adapted to providing a resiliently loaded and releasable coupling of the sprocket 27, and a preferred embodiment of the structure for quick sprocket replacement is shown in FIG. 6.

Figure 6:
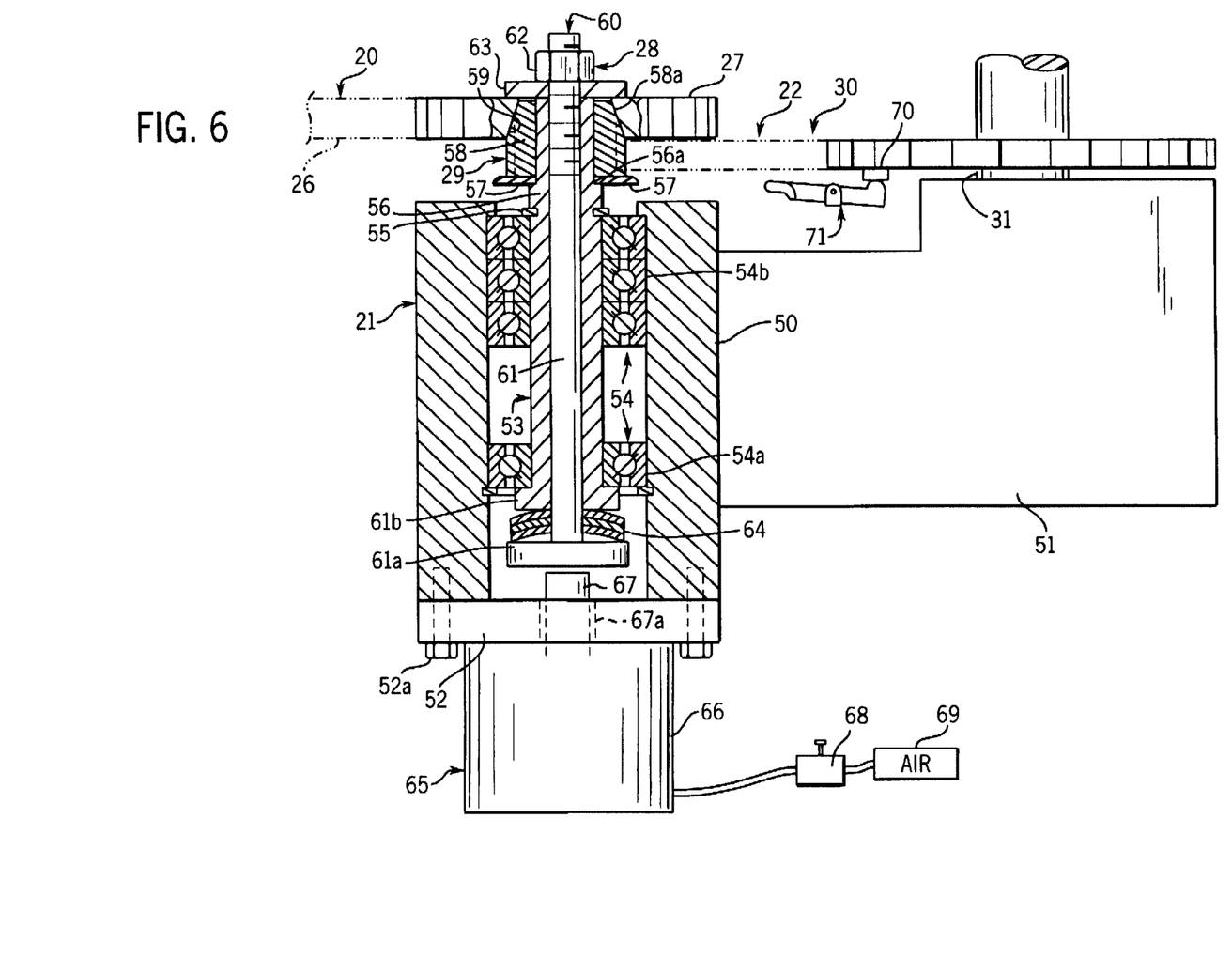
FIG. 6 is an enlarged side elevational view with parts broken away and shown in section, of the sprocket coupling unit shown in FIGS. 3 and 4.

Referring particularly to FIGS. 3 and 6, an outer bearing housing 50 is mounted to the mean drive housing 51 in any suitable system, such as being bolted thereto with the shaft unit 28 spaced outwardly of the main drive housing 51. The bearing housing 50 is a tubular member which is sealed by a bottom wall 52, bolted in place as by bolts 52a. A sprocket shaft 53 is rotatably mounted within the bearing housing 50. A roller bearing assembly 54 is secured within the housing and supports shaft 53. The roller bearing assembly includes a plurality of spaced angulated contact bearings 54a and 54b. In the illustrated embodiment of the invention, a single lower bearing 54a is formed with a particular angulated orientation. In upwardly spaced relation thereto, a plurality of annular contact bearings 54b are oriented with an opposite angulated contact bearing structure, as illustrated. The sprocket shaft 53 is a tubular member journalled within the rotor bearing assembly 54 and the lower end terminates within the housing 50 in spaced relation to the bottom wall 52. The upper end of the shaft 53 projects upwardly from the housing, with a snap ring 55 supporting the shaft on the uppermost bearing 54b. The exposed upper end has an inset cylindrical sprocket portion 56 of a reduced diameter and defines a ridge 56a on which a supporting washer 57 is located. The sprocket 29 is located on the sprocket portion 56, with the sprocket teeth aligned with the drive belt 30. The sprocket has a central base or hub 58, with an outer end projecting axially upwardly and outwardly of the belt 30. The outer projecting portion of the hub 58 is formed with a tapered wall 58a. The indexer output sprocket 27 has a central opening 59 and forming a mating hub portion with a matching taper. The sprocket 27 telescopes into mating engagement between the tapered walls 58a and 59. In the illustrated embodiment of the invention, a taper of approximately 20 degrees is illustrated and has been found to provide a highly satisfactory mating surface.

A bolt and nut unit 60 extends through the tubular shaft 53 and serves to releasably clamp the sprocket 27 to the sprocket 29, and the sprocket 29 to the shaft, as follows. The unit 60 includes the bolt 61, formed as a rod-like member, passing through the center of the tubular shaft 53. The bolt head 61a is located within the bearing housing 50 in downwardly spaced relation to the inner end of the shaft 53, which has a head 61b abutting-the bearing 54a. The bolt 61 extends outwardly of the sprocket assembly with an outer nut 62 and an interposed washer 63 on the bolt. The head 61a and bolt 61 form outer clamp members. The washer 63 abuts sprocket 27. A plurality of Belleville washers 64 are interposed between the bolt head 61a and the head 61b of the tubular bearing shaft 53. The Belleville washers 64 are well known circular washers having a curved configuration with an inwardly located spaced portion from which the washers project radially and axially. In the illustrated embodiment of the invention, the Belleville washers 64 are telescopically located onto the bolt between the bolt head 61a and the head 61b of the tubular shaft 53. The base portion of washers 64 is located abutting the head 61b of the shaft 53, with the outer peripheral edges of the Belleville washers located to engage the head 61a of bolt 61. When the nut 62 is tightened onto the bolt, the washer 63 engage the face of the sprocket 29 and draws the bolt 61 upwardly to exert a clamping force onto the sprocket 29, with the collapsing of the Belleville washers 64 onto the head 61a as a stop member. This interconnects the two sprockets 27 and 29 along the tapered surfaces or walls 58a and 59 and locks the sprockets to each other and to the shaft 53 to provide a total rotating assembly including the bolt, washers, shaft and sprockets. This permits a tight securement of the sprockets to each other with a strong driving force at the interface of the sprockets with a resilient loading and forcing of the sprockets into firm abutting engagement with a one-to-one rotation of the sprockets assuring the desired one-to-one rotation of the indexing sprocket and belt drive assembly.

To facilitate the rapid and low cost separation and replacement of parts, a power motor unit 65 forming a powered release unit is secured to the housing to permit the release of the spring tension created by the Belleville washers 64. In the illustrated embodiment of the invention, the power motor unit 65 is a fluid cylinder unit 66 mounted to the bottom cover or wall 52. In particular, a cylinder 66 is secured abutting the exterior of the wall. A piston rod 67 is connected to a piston, not shown, within the cylinder 66 and the rod extends outwardly therefrom through an opening 67a in the bottom wall. The piston rod 67 extends inwardly into slightly spaced relation to the bolt head 61a, with the nut 62 in the drive engaging position and thus the rotating assembly in the normal operative notching state. When it is necessary to replace the sprocket 27, the power cylinder 66 is actuated. In the illustrated embodiment of the invention, a push button control valve 68 is shown coupled to the cylinder and to a pressurized air source 69. The control valve 68 permits applying pressurized air to cylinder 66 for moving the piston and attached piston rod 67 outwardly sufficiently to substantially compress the Belleville washers 64 and thereby raise the nut 62 from the sprocket 27 and release the clamping force at the surfaces 58a and 59 within the sprocket coupling unit. The nut 62 can then be readily removed by hand, or with a very simple tool, the washer 64 and the sprocket 27 readily removed and replaced. Thus, actuation of the control valve 68 provides for rapid manual release and replacement of the sprockets generally without the necessity of a ratio change, tools or the like. Thus, the nut is generally spun off and the sprocket or sprockets removed manually.

As previously discussed, it is extremely important that the punch drive location and the indexer drive be precisely oriented with respect to each other to establish the initial precise location and subsequent movement of the lamination blank within the notching machine.

Release of the sprockets and of the sprocket clamping unit, as described above, permits the independent rotation of the sprockets 27 and 29 is permitted.

The released sprocket and belt drive assembly therefore permits the ready reset of the indexing sprocket 27 and the drive sprocket 29 and permits appropriate rapid set up for back-to-back adjustment between the indexer and the indexer drive. To adjust for back-to-back alignment with the two sprockets 27 and 29 released, the indexer 18 is placed in the null position of its index cycle corresponding to, for example, the bottom or notching position of the punch stroke. The released drive sprocket 31 has a locating element 70 which when located in engagement with a stop member 71 positions the lamination support table 9 in proper rotational orientation. Stop member 71 is shown as a hand operated spring return stop dog, with element 70 a simple bottom wall projection. Once the adjustment has been made, the push button unit 68 is released and the sprockets 27 and 29 again are forced into interlocking engagement, with proper orientation of the indexer 18 and punch unit 13, as required for proper set up.

In summary, the present invention allows the rapid replacement of long life indexing components, producing a highly cost effective notching machine for lamination notching and the like. The illustrated embodiment of the invention includes the specific interrelationship between the profiles of the belt and the sprocket, with modification of the sprocket to substantially if not fully eliminate the conventional clearance between the belt and sprocket. This of course could be accomplished by appropriate modification of the belt, but in view of the longer life of the sprockets and the low cost of standard belts, the sprocket modification is obviously the most desirable in view of the fact that the sprocket requires infrequent replacement and even then can be accomplished in a rapid, effective manner. Although, a particular profile has been used, any other profile could of course be provided with appropriate modification to match the sprocket in such a manner as to maintain the desired precise orientation and translation motion within the notching machine. Although it is also known that a backlash can be eliminated by using offset split sprockets, which could be broadly applied in accordance with the present invention, such a modification would be relatively costly compared to the inventor's direct sprocket modification system, and particularly with the very simple and rapid replacement feature provided by the present invention in combination with the direct rapid and effective set up adjustment required in the notching machine. Similarly, the spring-loaded sprocket support to provide a passive coupling force on the two sprockets can use other and keyless locking unit with a resilient devices or force amplifying application devices. Belleville washers provide a unique advantage in that they establish a very high working force in a relatively small area and thus are particularly adapted to the incorporation into the supporting bearing structure.

The notching machine provided by this invention has the several advantages: including (1) rapid back-to-back setting of the indexer and the punch unit; (2) rapid replacement of the ratio adjusting members and (3) the rapid replacement of the wear parts, if any, within the index coupling and drive system; (4) long extended life components compared to the standard gear drive; and (5) ease of part replacement with only minimal skill requirements. All of the above advantages are obtained without loss of the desired precise angular movement and location of notches within the lamination.

Various modes of carrying out the invention are contemplated as being within the scope of the following claims particularly pointing out and distinctly claiming the subject matter which is regarded as the invention.

I claim:

1. A notching apparatus drive system operated in synchronism with a punch unit having a cyclical operation period and for sequentially rotating a blank lamination through the punch unit for forming of notches in the blank lamination, comprising a lamination support unit having a lamination receiving holder and a drive sprocket for rotating said holder, an indexing unit having an indexing output sprocket and having an input drive unit operable in synchronism with the punch unit, said indexing unit moving said output sprocket in predetermined steps including a dwell period, a coupling sprocket unit interconnecting said drive sprocket with said output sprocket of said indexing unit, said coupling sprocket unit including a coupling input sprocket and a coupling output sprocket mounted in common to a coupling shaft and rotatable supporting said coupling input sprocket and coupling output sprocket for simultaneous rotation, a first sprocket belt entrained about said drive sprocket and said coupling output sprocket and a second sprocket belt entrained about said coupling input sprocket and said indexing output sprocket, whereby said stepped movement of said indexing output sprocket rotates the lamination receiving holder through the punch unit for providing successive notches within the blank lamination with successive notches in equally spaced array, said coupling output sprocket and said coupling input sprocket include telescoped hub portions mounted on said coupling shaft, a passive and keyless locking unit coupling said hub portions to each other and to said shaft for said rotatably supporting said coupling output sprocket and said coupling input sprocket, said locking unit including a powered release unit coupled to said hub portions for quick release of said locking unit.

2. A notching drive apparatus of claim 1 wherein said lamination receiving holder is a rotating table for supporting said blank lamination, said spacing between adjacent notches differs substantially by no more than ±0.005 inches, said coupling output sprocket and said first sprocket belt having mating sprocket teeth and cavities and having said mating teeth and cavities mating with substantially zero clearance and backlash and thereby positioning of said lamination with the spacing of immediately adjacent lamination notches being substantially equal to the spacing of any other immediately adjacent notches, said sprocket coupling unit including a bearing housing mounted in adjustably fixed relation to said output sprocket of said indexing unit, a support shaft rotatably mounted within said bearing housing and projecting outwardly and upwardly therefrom on the outer end of said shaft and having telescoped hub portions on said shaft, the surfaces of said hub portions having correspondingly tapered mating and frictionally engaged surfaces extending coaxially of the shaft and thereby permitting ready axial separation of the sprockets, a resilient clamping assembly forcing the hub portions to each other on said shaft, and a powered release unit coupled to said clamping assembly to selectively release the loading of said clamping assembly and permitting direct access to said coupling input and output sprockets to facilitate replacement of said coupling sprockets of said coupling unit.

3. The drive system of claim 1 wherein said first and second sprocket belts include teeth and cavities of an HTD profile, said input and output sprockets each include teeth and cavities which mesh with said second and first sprocket belts over substantially 180 degrees of each sprocket, said teeth and cavities of said input and output sprockets being constructed with an angle between the center lines of each tooth and an adjacent cavity equal to 180 degrees divided by the number of teeth, each belt has a pitch diameter (DP) equal to the number of teeth times 0.100255, each said sprocket tooth having an outside diameter (OD) equal to the pitch diameter (DP) minus 0.054 inches, and each said sprocket tooth having a radius pitch (RP) equal to said outside diameter (OD) divided by two minus 0.033 inches.

4. The drive, system of claim 3 wherein each tooth and adjacent cavity of said input and output sprockets are constructed with each tooth having a round tooth edge having a radius equal to 0.033 inches, and each adjacent cavity of said input and output sprockets having a cavity inner base with a radius of 0.100 inches, and said round tooth edge and said inner base connected at the tangent point therebetween.

5. A notching apparatus having a punch unit and a lamination support unit operated in synchronism with the movement of said punch unit, comprising an indexing unit coupled to said lamination support unit for moving of the blank lamination through said punch unit for establishing spaced notches in said blank lamination, a belt and sprocket drive unit including a sprocket coupling unit having an input sprocket and an output sprocket, said sprockets having telescoped hub portions with complementing extended axially tapered surfaces permitting the ready axial separation of said sprockets and permitting frictional rotary engagement, a bearing structure, a sprocket shaft mounted in said bearing structure and projecting through the innermost hub portion of said telescoped hub portions mounted on said shaft, an elongated clasp member extended through said shaft and including first and second outer clamp members aligned with said hub portions, a resilient member coupled to said elongated clasp member and positioning said clamp members for forcing said input and output sprockets into firm abutting engagement establishing one-to-one rotating of the input and output sprockets, and a powered release unit coupled to said resilient member and operable to release said resilient member and thereby permitting direct separation of said input and output sprockets for replacement thereof.

6. The apparatus of claim 5 wherein said elongated clasp member is a rod member extended through said shaft and extending outwardly of said input and output sprockets, a stop member secured within said bearing structure, said rod member having an inner head forming one of said clamp members, said head being spaced from said stop member within said bearing structure, said resilient member is interposed between said head and said stop member and urging said rod member inwardly of said bearing structure and said input and output sprockets, said second clamp member being releasably secured to an outer end of said rod member and forced by said resilient member into clamping engagement with an outer surface of said input and output sprockets; said powered release unit includes a motor unit with a member movable into engagement with said head and overcomes said resilient member to move said second clamp member away from said input and output sprockets and thereby permit the ready manual release of said second clamp member from said rod member for convenient rapid manual replacement of said input and output sprockets.

7. A notching apparatus having a blank lamination receiving holder is it rotated in synchronism with a punch unit, comprising a drive system connected to said blank lamination support unit and to said punch unit, said drive system including a coupling unit having a first rotating drive member and a second rotating drive member, a bearing structure, a bearing shaft mounted within said bearing structure and projecting upwardly of said bearing structure, said first and second rotating drive members include hub portions mounted on said shaft, a passive and keyless clamping assembly engaging said hub portions and interconnecting said rotary drive members in interengagement to said shaft, said passive and keyless clamping assembly including a resilient member coupled to the rotating drive members and forcing the drive members into firm driving engagement to each other and to said shaft and establishing corresponding rotation to the drive members, and a powered release unit coupled to said resilient member and operable to release said resilient member and permitting manual separation of said drive members for replacement thereof.

8. The apparatus of claim 7 wherein said bearing structure includes a stop member, said clamping assembly includes an elongated clasp member extended through said shaft and extending outwardly of said shaft and said rotating drive members, said elongated clasp member having an inner head spaced from said stop member, said resilient member interposed between said inner head and said stop member and resiliently urging the elongated clasp member through said drive members, a releasable clamping member releasably secured to an outer end of said elongated clasp member and urged by said resilient member into clamping engagement with the drive members and thereby securing the drive members to said shaft, and said powered release unit being secured to said bearing structure and movable into engagement with said inner head and operable to positively overcome the resilient force of said resilient member to move said releasable clamping member from said drive members and thereby permit the manual release of said releasable clamping member and thereby said drive members from said elongated clasp member for convenient rapid manual replacement of said drive members.

9. A notching apparatus drive system for translating a drive operated in synchronous with a punch unit having a continuous reciprocal motion for sequentially rotating a lamination blank through the punch mechanism, comprising a drive unit for operating the punch unit, a lamination support for the lamination blank, an indexing unit having an input member connected to said drive unit for rotating the lamination support through the punch unit and producing successive notches within the blank with successive notches in equally spaced array, said indexing unit moving said lamination blank through the punch unit in equal and predetermined stepped relationship to define a spacing between adjacent notches within a preset distance, said indexing unit having a rotating output member, a coupling unit interconnecting said rotating output member of said indexing unit to said lamination support, said coupling unit including at least first and second sprockets mounted on a common shaft to establish a one-to-one rotation thereof, a passive and keyless clamping unit having a resilient member establishing a pressure engagement between the sprockets to said shaft, and a powered release unit coupled to said passive and keyless clamping unit for releasing said resilient member for removal of said first and second sprockets.

* * * * *

UNITED STATES PATENT AND TRADEMARK OFFICE
CERTIFICATE OF CORRECTION

PATENT NO. : 5,797,306

DATED : August 25, 1998

INVENTOR(S) : LARRY I. KUFAHL

It is certified that error appears in the above-identified patent and that said Letters Patent is hereby corrected as shown below:

Claim 4, column 13, line 3, after "drive" delete " , "; Claim 6, column 13, line 48, after "sprockets" delete " ; " and substitute therefor -- , --; Claim 6, column 13, line 48, delete "with-a" and substitute therefor -- with a --; Claim 7, column 13, lines 55-56, delete "receiving holder is it" and substitute therefor -- support unit --.

Signed and Sealed this

Sixteenth Day of November, 1999

*Attest:*

Q. TODD DICKINSON

*Attesting Officer*    *Acting Commissioner of Patents and Trademarks*